US005893450A

United States Patent [19]
Metivier

[11] Patent Number: 5,893,450
[45] Date of Patent: Apr. 13, 1999

[54] ROLLER CONVEYOR CLEANING APPARATUS

[75] Inventor: James Willard Metivier, Meridian, Id.

[73] Assignee: Micron Electronics, Inc., Nampa, Id.

[21] Appl. No.: 08/923,617

[22] Filed: Sep. 4, 1997

[51] Int. Cl.$^6$ .................................................. B65G 45/18
[52] U.S. Cl. ...................... 198/496; 198/498; 15/256.53
[58] Field of Search ............................ 198/494, 496, 198/498; 15/256.53

[56] References Cited

U.S. PATENT DOCUMENTS

| | | |
|---|---|---|
| 50,634 | 10/1865 | Sharp . |
| 469,103 | 2/1892 | Taylor . |
| 972,058 | 10/1910 | Chisholm . |
| 1,791,728 | 2/1931 | Linfesty ................................ 198/496 |
| 2,964,126 | 12/1960 | Peterson ............................ 198/498 X |
| 3,139,975 | 7/1964 | Schaefer . |
| 3,229,808 | 1/1966 | Olson . |
| 3,858,715 | 1/1975 | Brock et al. . |
| 3,999,239 | 12/1976 | Misuna . |
| 4,019,217 | 4/1977 | Schinke ................................ 15/256.53 |
| 4,042,364 | 8/1977 | King et al. . |
| 4,623,060 | 11/1986 | Rulke ................................ 198/498 X |
| 4,767,438 | 8/1988 | Bates ............................ 15/256.53 X |
| 5,060,335 | 10/1991 | Webster . |
| 5,117,968 | 6/1992 | Rivera . |
| 5,372,546 | 12/1994 | Brakke . |
| 5,427,251 | 6/1995 | Landmann et al. ................ 198/498 X |

FOREIGN PATENT DOCUMENTS 2174350  11/1986  United Kingdom .

*Primary Examiner*—James R. Bidwell
*Attorney, Agent, or Firm*—Dorsey & Whitney LLP

[57] ABSTRACT

An apparatus for cleaning the rollers of a roller conveyor. The apparatus comprises a platform frictionally engaging a plurality of the rollers such that the apparatus is conveyed along the roller conveyor by the rotation of the rollers, and a first cleaning element secured to the platform, wherein the first cleaning element engages a portion of the surface of the rollers as the apparatus is conveyed along the roller conveyor.

19 Claims, 7 Drawing Sheets

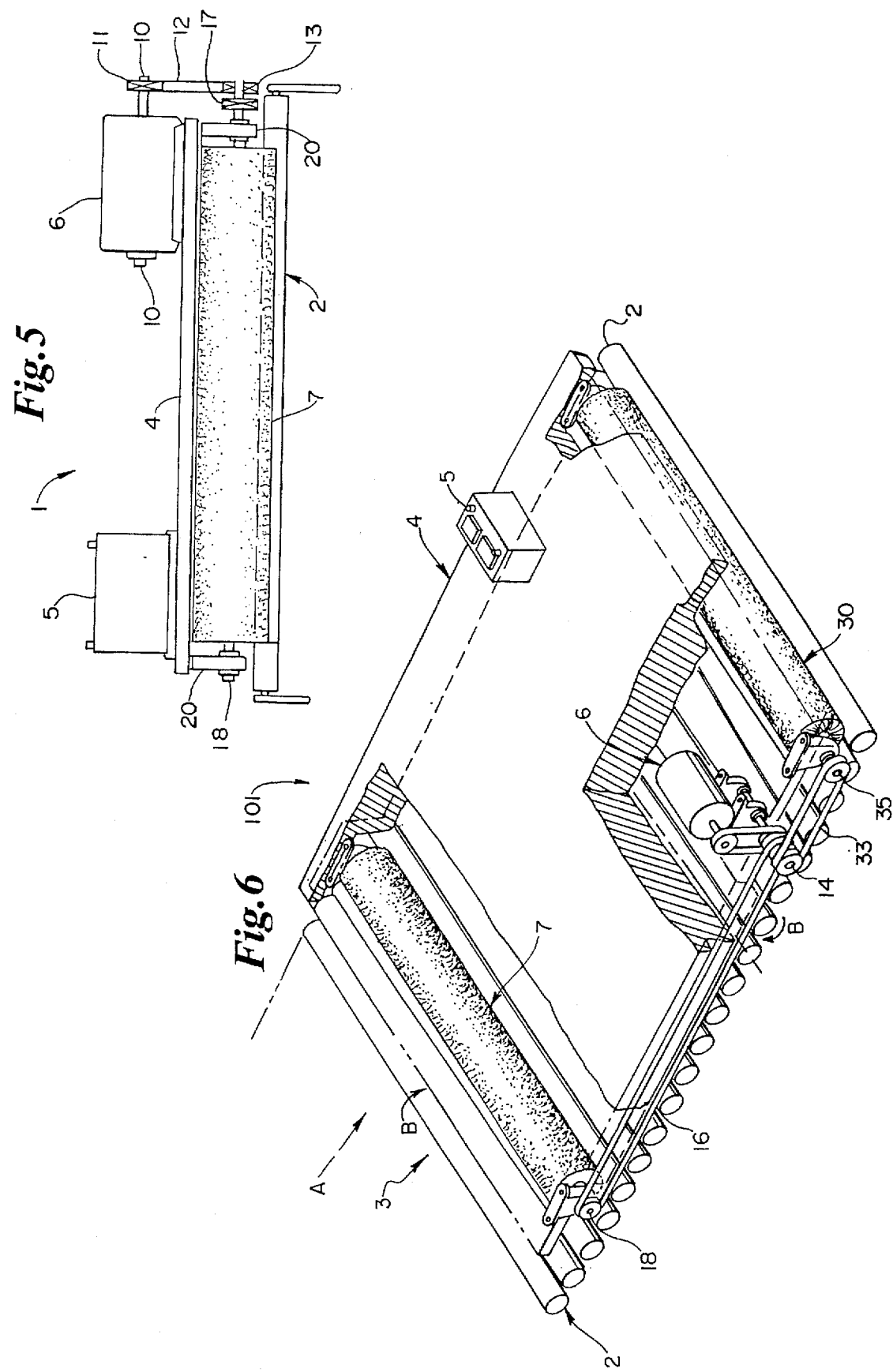

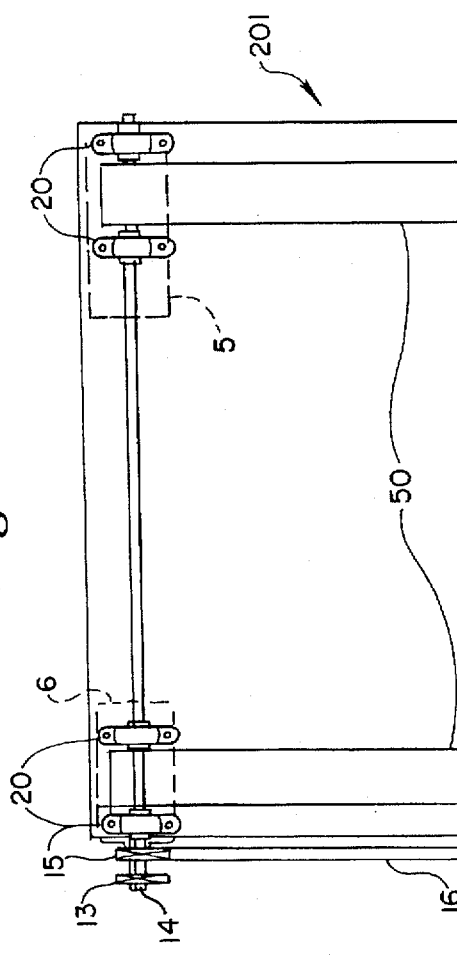
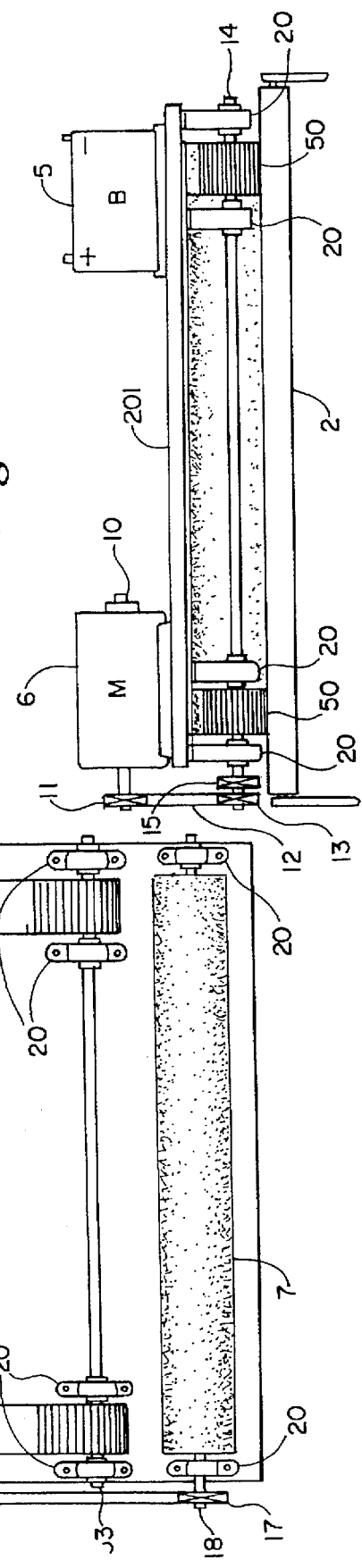
Fig. 12
Fig. 13

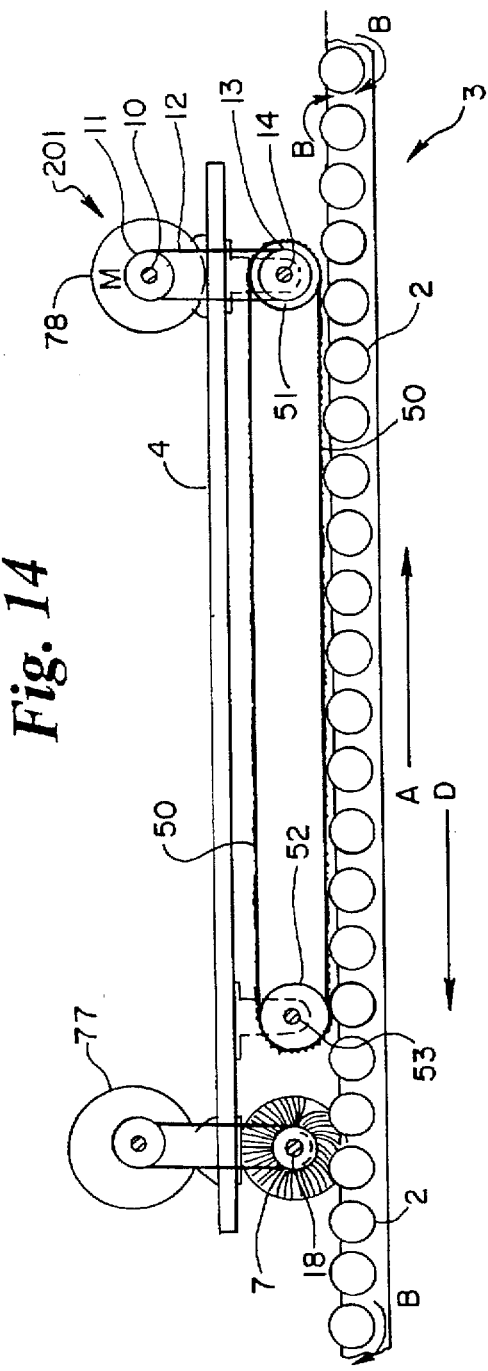
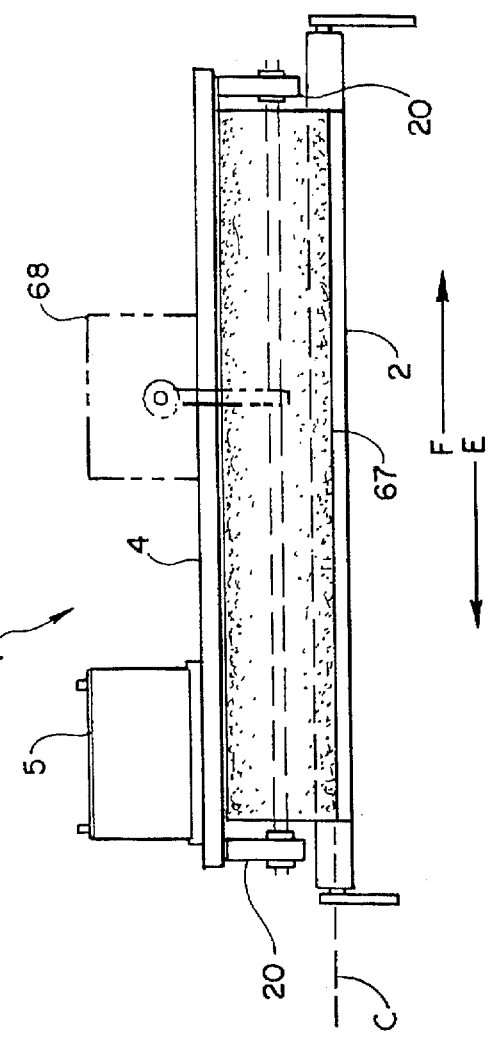
Fig. 14
Fig. 15

5,893,450

ROLLER CONVEYOR CLEANING APPARATUS

BACKGROUND OF THE INVENTION

1. Field of the Invention

This invention generally relates to cleaning devices. More particularly, this invention relates to apparatus for cleaning the rollers of a roller conveyor.

2. Description of the Prior Art

Roller conveyors are used to convey items from one location to another. A typical roller conveyor is comprised of a plurality of rotating cylindrical rollers evenly spaced throughout the roller conveyor and having generally parallel axes of rotation. The rollers of a roller conveyor may be rotatably driven by conventional means to apply a tractive force to an item placed upon the roller conveyor, thereby conveying the item along the roller conveyor in a direction perpendicular to the axes of rotation of the rollers.

Roller conveyors are commonly found in factories and warehouses. In these environments, especially, debris may accumulate and become encrusted upon the cylindrical surfaces of the rollers. When too much debris has accumulated, the rollers may jam together, which may cause the entire roller conveyor to be shut down.

One current method for preventing debris accumulation on the rollers is to manually clean the surface of each individual roller periodically with cloth and cleaning agents. However, because a roller conveyor may comprise thousands of rollers, this method takes a substantial amount of time to implement and requires substantial manpower. Additionally, the roller conveyor will usually be inoperable while the rollers are manually cleaned. The period of inoperability of the roller conveyor during manual cleaning can result in lost revenues from delayed shipments, delayed production and various other delay-associated costs. Thus, a need exists for a method and apparatus for cleaning the rollers of a roller conveyor that is less time consuming, requires less manpower, requires less down time for the roller conveyor and is less expensive than manual cleaning.

SUMMARY OF THE INVENTION

This invention comprises an apparatus for cleaning the rollers of a roller conveyor. One embodiment of the invention is an apparatus comprising a platform frictionally engaging a plurality of the rollers, such that the apparatus is conveyed along the roller conveyor by the rotation of the rollers, and a first cleaning element secured to the platform, wherein the first cleaning element engages a portion of the surface of the rollers as the apparatus is conveyed along the roller conveyor. Another embodiment of the invention comprises a second cleaning element secured to the platform such that the second cleaning element engages a portion of the surface of the rollers as the apparatus is conveyed along the roller conveyor.

Yet another embodiment of the invention is an apparatus comprising a platform, a rotatable endless belt and a cleaning element operatively secured to the platform, wherein the outer surface of the endless belt frictionally engages a plurality of the rollers such that the apparatus is conveyed along the roller conveyor in a first direction and wherein the cleaning element engages a portion of the surface of the rollers as the apparatus is conveyed along the roller conveyor. In this embodiment, the rotational speed of the endless belt may be varied such that the velocity of the apparatus in the first direction is changed.

DESCRIPTION OF THE DRAWINGS

FIG. 5 is a rear view of the embodiment shown in FIG. 1;

FIG. 6 is a perspective view of another embodiment of the invention;

FIG. 12 is a bottom view of the embodiment shown in FIG. 10;

FIG. 13 is a front view of the embodiment shown in FIG. 10;

FIG. 14 is a side view of an alternative embodiment of the embodiments shown in FIGS. 1–13;

FIG. 15 is a rear view of an alternative embodiment of the embodiments shown in FIGS. 1–13.

DETAILED DESCRIPTION

This application is related to an application titled "A Method For Cleaning the Rollers of a Roller Conveyor" filed on even date herewith, Ser. No. 08/923,626.

Figure 1:
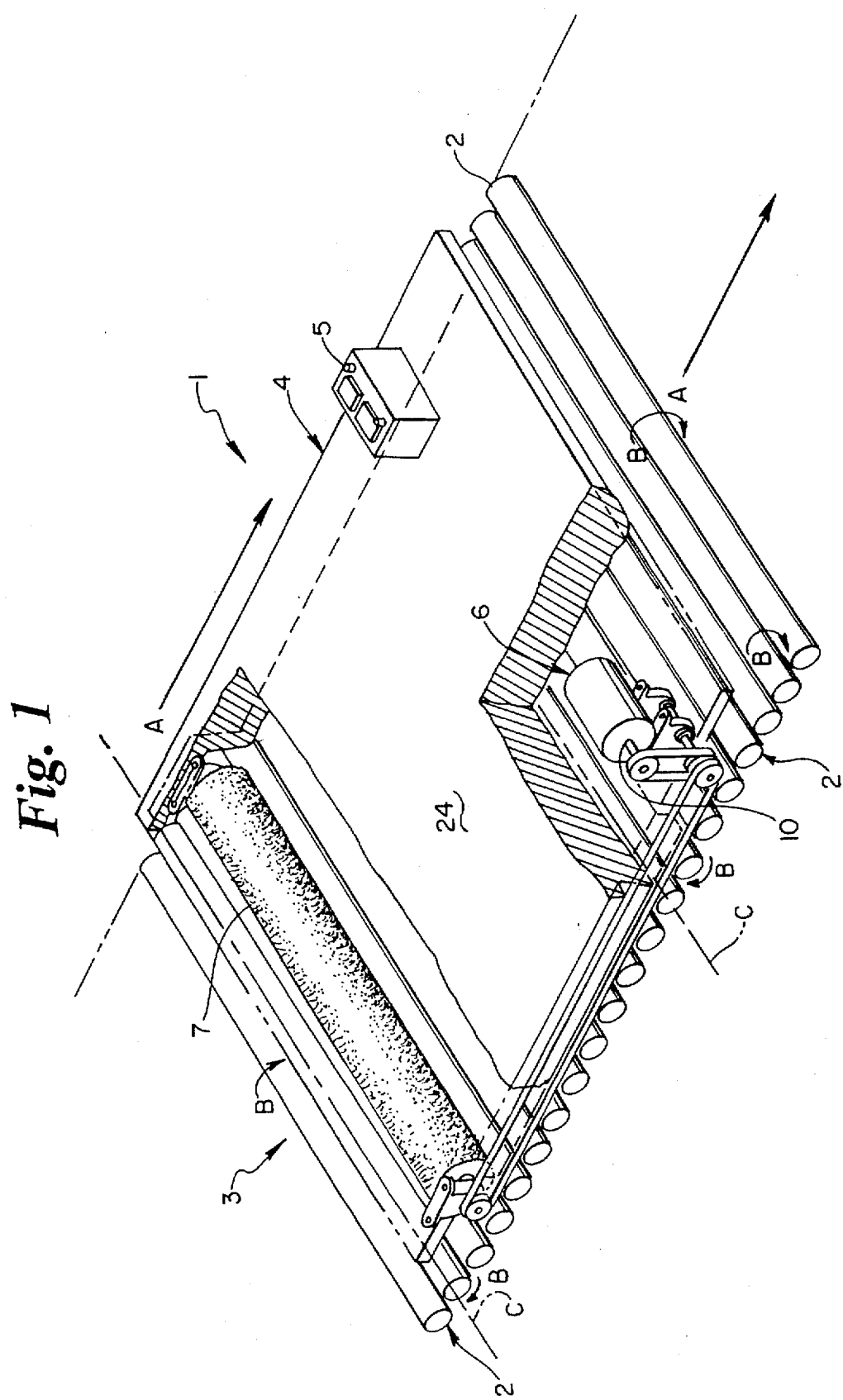
FIG. 1 is a perspective view of an embodiment of the invention.

Referring to FIG. 1, there is shown a typical roller conveyor, referred to in its entirety as 3. The rollers 2 of a typical roller conveyor 3 may be evenly spaced from approximately 1/10 to 1/4 of an inch apart, although in some portions of the roller conveyor 3, such as turns or bends, the rollers 2 may be spaced unevenly. The rollers 2 have substantially cylindrical surfaces and all the rollers 2 of the roller conveyor 3 rotate in the same direction as shown by arrows B. The rollers 2 may be rotated by conventional means, such as motor driven sprocket and chain assemblies operatively connected to the rollers 2 (not shown). Items, such as pallets, placed upon the roller conveyor 3 will be conveyed along the roller conveyor 3 by the tractive force of the rollers 2 upon the item, such that the item is conveyed along the roller conveyor 3 at a relatively constant velocity (the basic transport velocity of the roller conveyor 3) in a direction perpendicular to the axes of rotation C of the rollers 2.

Referring now to the embodiment of the invention illustrated in FIGS. 1–5, there is shown a roller conveyor cleaning apparatus, referred to in its entirety as 1, for cleaning the cylindrical surfaces of the rollers 2 of a roller conveyor 3. The roller conveyor cleaning apparatus 1 generally comprises a platform 4, a DC battery 5, a motor 6, a first cleaning element 7 and one or more drive linkage arrangements between motor 6 and cleaning element 7, such as sprocket and chain assemblies.

Figure 2:
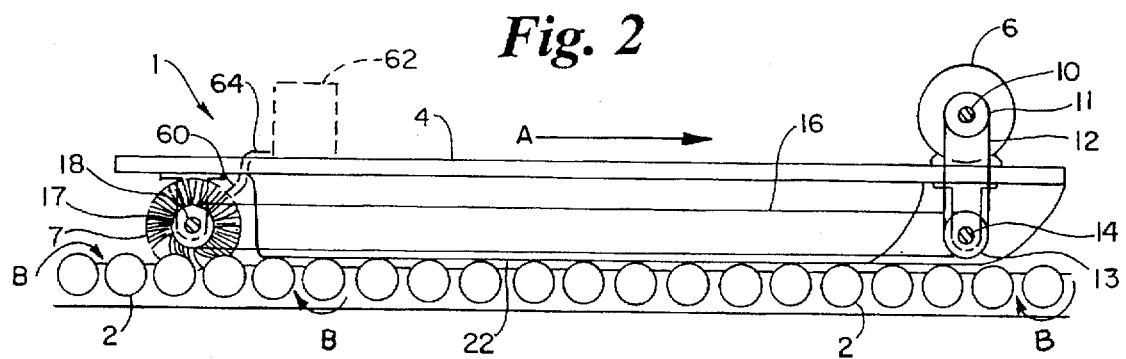
FIG. 2 is a side view of the embodiment shown in FIG. 1.

As best shown in FIG. 2, a portion of the lower surface 22 of the platform 4 is supported by and frictionally engages the rollers 2 of the roller conveyor 3. In this manner, the roller conveyor cleaning apparatus 1 is conveyed at a relatively constant velocity in direction A along the roller conveyor 3 by the tractive force of the rollers 2 rotating in direction B. In fact, assuming adequate frictional engagement, the cleaning apparatus can be inserted in a flow of items being transported on the roller conveyor 3 and will perform cleaning without interrupting the transport speed of those items. That is, the cleaning apparatus will be transported at the basic transport velocity of the roller conveyor 3.

Mounted upon the upper surface 24 of the platform 4 by conventional means (not shown) are a DC battery 5 and a motor 6 which is powered by the DC battery 5. The motor 6 may be of the type having a variable speed setting and may be bidirectional to provide rotation in the same or opposite direction to that of the rollers 2. As best shown in FIG. 2, rotatably mounted upon the lower surface 22 of the platform 4 near the rear of platform 4, is the first cleaning element 7. The first cleaning element 7 may be mounted such that its axis of rotation is substantially parallel to the axes of rotation of the rollers 2. As shown in FIG. 2, the platform 4 is formed with a recess to accommodate the first cleaning element 7.

Figure 3:
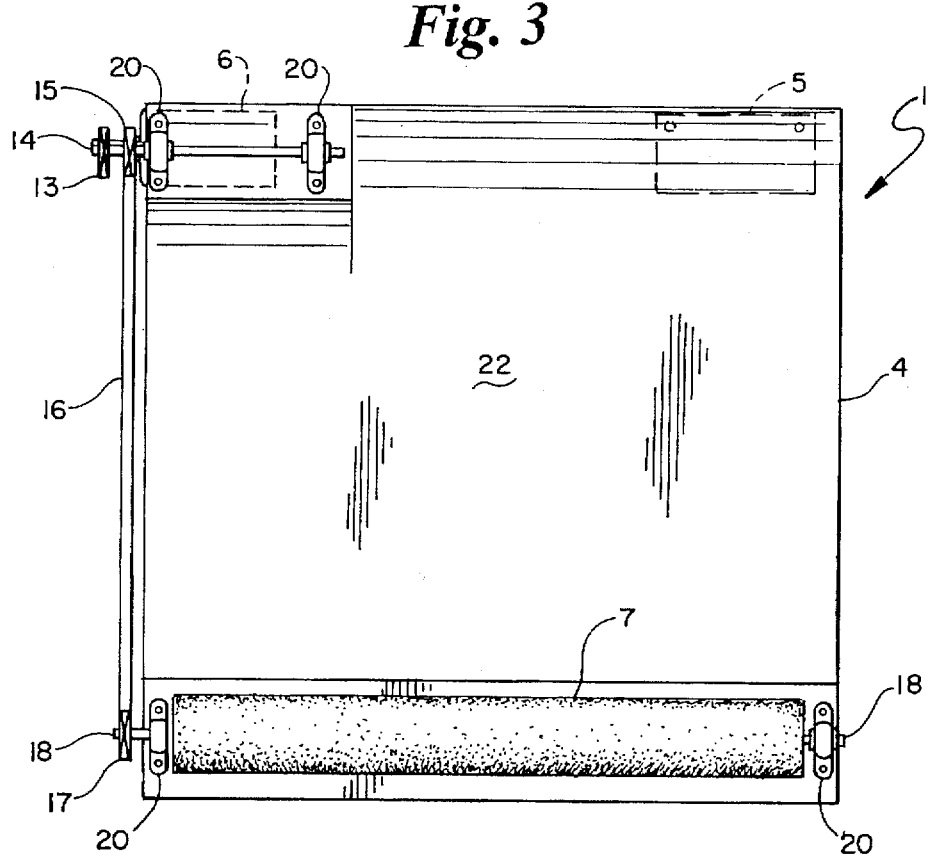
FIG. 3 is a bottom view of the embodiment shown in FIG. 1.
Figure 4:
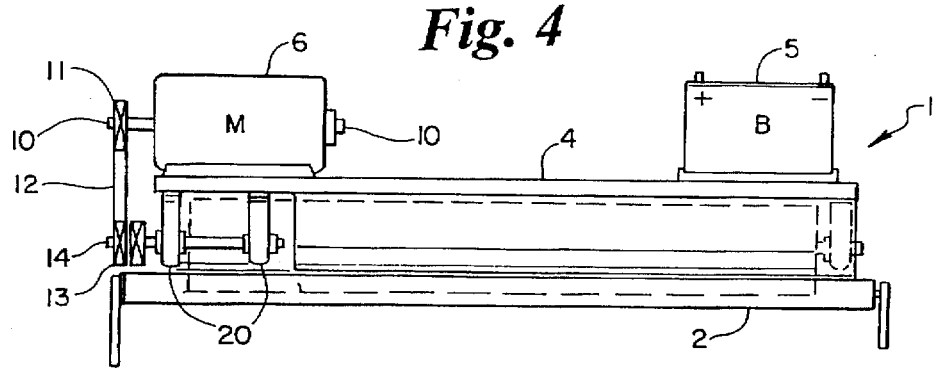
FIG. 4 is a front view of the embodiment shown in FIG. 1.
Figure 7:
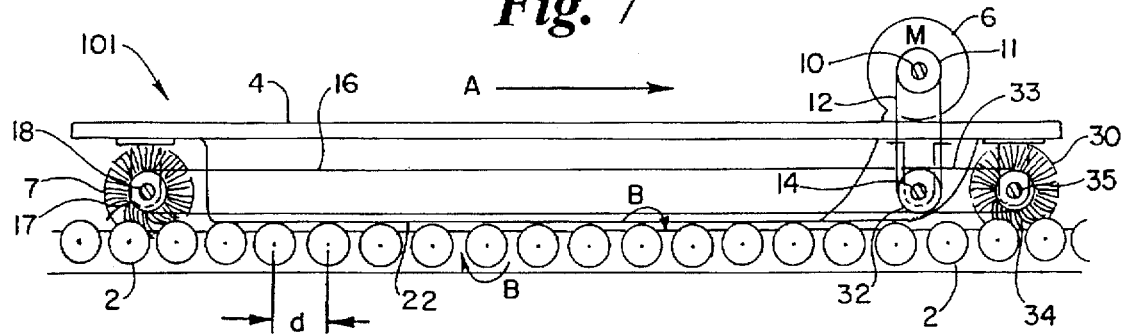
FIG. 7 is a side view of the embodiment shown in FIG. 6.

In general, the first cleaning element 7 is cylindrical and is rotatably driven by the motor 6 as follows. The motor 6 rotatably drives a motor shaft 10. Mounted to the rotating motor shaft 10 is a sprocket 11 over which passes an endless chain 12 to a sprocket 13. Sprocket 13 is mounted to a second shaft 14 journaled to rotate in a pair of bearing blocks 20. As best shown in FIG. 4, these particular bearing blocks 20 are mounted upon the lower surface 22 of the platform 4, which is formed to accommodate the bearing blocks 20 and the second shaft 14. As best shown in FIG. 3, also rotatably mounted to the second shaft 14 is a sprocket 15 over which passes an endless chain 16 extending to a sprocket 17. Sprocket 17 is mounted to a first cleaning element shaft 18, which is also journaled to rotate in a pair of bearing blocks 20. The first cleaning element 7 is removably mounted to the first cleaning element shaft 18 (or, alternatively, the entire assembly of cleaning element 7 and shaft 18 is removable). Thus, the motor 6 will drivingly rotate the first cleaning element 7 through a plurality of shafts and sprocket and chain assemblies.

As best shown in FIGS. 1, 2 and 5, the first cleaning element 7, shown in the drawings as a conventional cylindrical brush, engages at least a portion of the surface of each of the rollers 2 as the roller conveyor cleaning apparatus 1 is conveyed along the roller conveyor 3. It is this engagement of the rollers 2 by the first cleaning element 7 and rotation of the cleaning element 7 such that its bristles, scrubbing fingers (or other surface features) move relative to the rotating rollers 2, that provides the cleaning action to the rollers 2, thereby removing accumulated debris.

In the embodiment of the invention described above, the motor 6 and the rotational motion it provides to the cleaning element 7 have no substantial effect upon the direction or velocity at which the roller conveyor apparatus 1 is conveyed along the roller conveyor 3. Consequently, the motor 6 may rotate the first cleaning element 7 in the same or opposite direction to that of the rotation of rollers 2 with no substantial effect upon the area of the surface portion of the rollers 2 engaged by the first cleaning element 7. Assuming that the platform 4 has good tractive engagement with the roller 2, it will travel at the same velocity as a point on any of the rollers 2 conveying it. This limits the "dwell time" of first cleaning element 7 over any one roller 2. The area of the surface portion of the rollers 2 engaged by the first cleaning element 7 may vary depending upon the vertical length of the bearing blocks 20 journaling the first cleaning element 7, the radius of the first cleaning element 7 and the ability of the first cleaning element 7 to deform when engaging the surface of the rollers 2. As best shown in FIG. 2, these variables may be selected such that the first cleaning element 7 rotationally engages and cleans substantially half of the surface of each roller 2 as the roller conveyor cleaning apparatus 1 is conveyed along the roller conveyor 3.

When utilizing this embodiment of the invention, if it is desired that the entire surface of the rollers 2 be cleaned, the roller conveyor cleaning apparatus 1 may be "reconveyed" along the roller conveyor a plurality of times until the first cleaning element 7 has engaged, in aggregate, the entire surface of the rollers 2. In order to minimize the number of reconveyances, the roller conveyor cleaning apparatus 1 may be selectively placed upon the roller conveyor 3 (i.e., selectively synchronized with the rotation of the rollers 2 in direction B) at the start of subsequent reconveyances such that the first cleaning element 7 engages previously unengaged surface portions of the rollers 2 as a roller conveyor cleaning apparatus 1 is reconveyed along the roller conveyor 3.

An alternative embodiment of the invention is shown in FIGS. 6–9. In this embodiment, a second cleaning element 30 has been added to the roller conveyor cleaning apparatus 101 of the type shown in FIGS. 1–5. The second cleaning element 30 is mounted generally towards the front of the alternative roller conveyor cleaning apparatus 101. In this embodiment, the rotational engagement of the second cleaning element 30 with the rollers 2 provides additional cleaning action to the rollers 2.

The second cleaning element 30 is rotatably driven by the motor 6 as follows. Mounted to the motor-rotated second shaft 14, described above, is a sprocket 32 over which passes an endless chain 33 to a sprocket 34. Sprocket 34 is mounted to a second cleaning element shaft 35, which is journaled to rotate in a pair of bearing blocks 20. The second cleaning element 30 is removably mounted to the rotating second cleaning element shaft 35 (or, alternatively, the entire assembly of cleaning element 30 and shaft 35 is removable). Thus, the motor 6 will drivingly rotate the second cleaning element 30 through a plurality of shafts and sprocket and chain assemblies in a similar manner to that described above.

Figure 8:
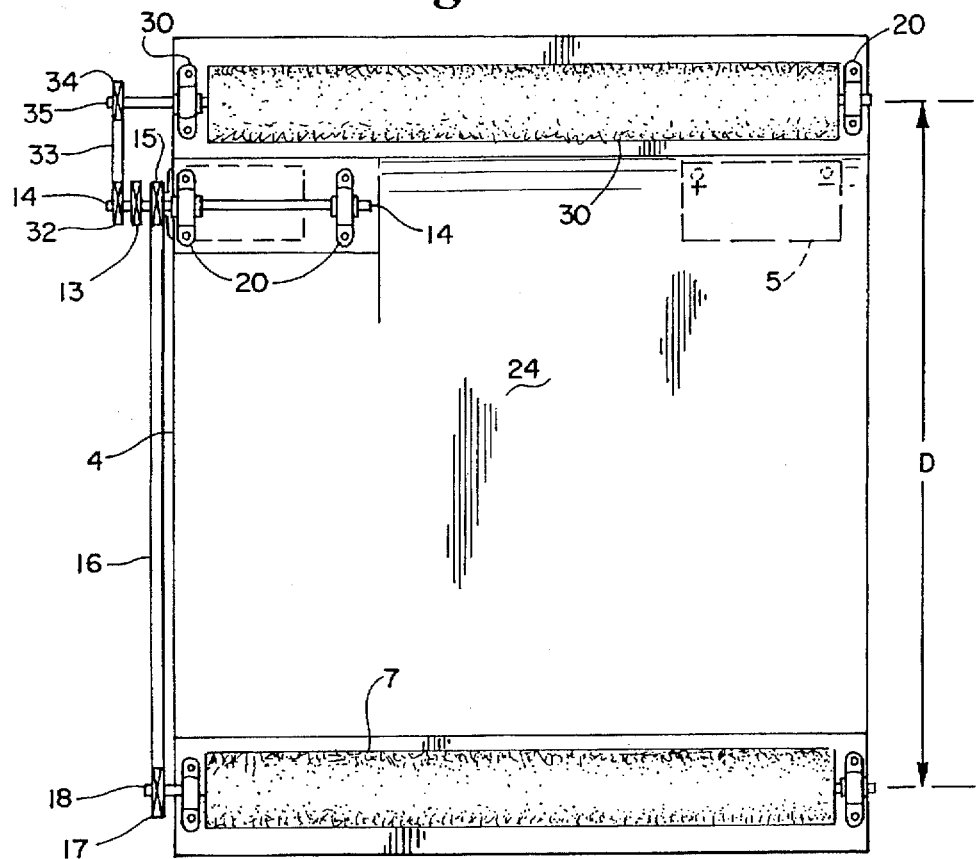
FIG. 8 is a bottom view of the embodiment shown in FIG. 6.
Figure 9:
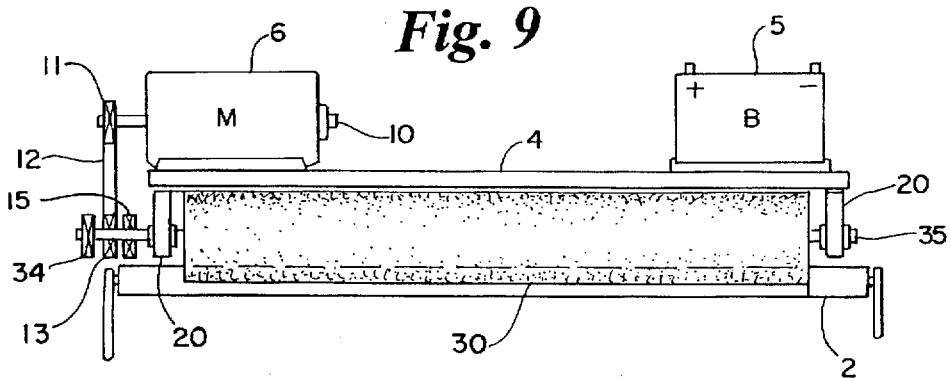
FIG. 9 is a front view of the embodiment shown in FIG. 6.

In this embodiment, the first and second cleaning elements 7 and 30, may be horizontally separated with respect to one another by a distance D, as shown in FIG. 8, such that a portion of the surface portion of a roller 2 not engaged by the second cleaning element 30 as the roller conveyor cleaning apparatus 101 is conveyed along the roller conveyor 3, is subsequently engaged by the first cleaning element 7. The optimal distance D, in such a case (assuming negligible slipping in conveyance by the rollers 2), is determined by the relationship:

$$D=(K+\tfrac{1}{2})d;$$

wherein K is equal to the desired number of rollers 2 between the first and second cleaning elements 7 and 30, and wherein d is equal to the distance between the rotational axes of consecutive rollers 2. Thus, in this embodiment, it may be possible for substantially the entire surface of the rollers 2 to be rotationally engaged by one or the other of the cleaning elements 7 and 30 as the roller conveyor cleaning apparatus 101 is conveyed in one pass along the roller conveyor 3. As in the previously described embodiment, the motor 6 has no substantial effect upon the direction or velocity at which the roller conveyor apparatus 101 is conveyed along the roller conveyor 3. Consequently, in this embodiment, the motor 6 may rotate the first and second cleaning elements 7 and 30 in the same or opposite direction to that of the rollers 2 with no substantial effect upon the area of the surface portion of the rollers 2 engaged by the first and second cleaning elements 7 and 30.

Yet another embodiment of the invention is shown in FIGS. 10–13. In this embodiment a pair of rotating endless traction belts 50 have been added to a roller conveyor cleaning apparatus 201 of similar to the type shown in FIGS. 1–5. Generally, in this embodiment, unlike the previously described embodiments, the direction and velocity at which the roller conveyor cleaning apparatus 201 is conveyed along the roller conveyor 3 may be controlled by a motor 6.

Figure 11:
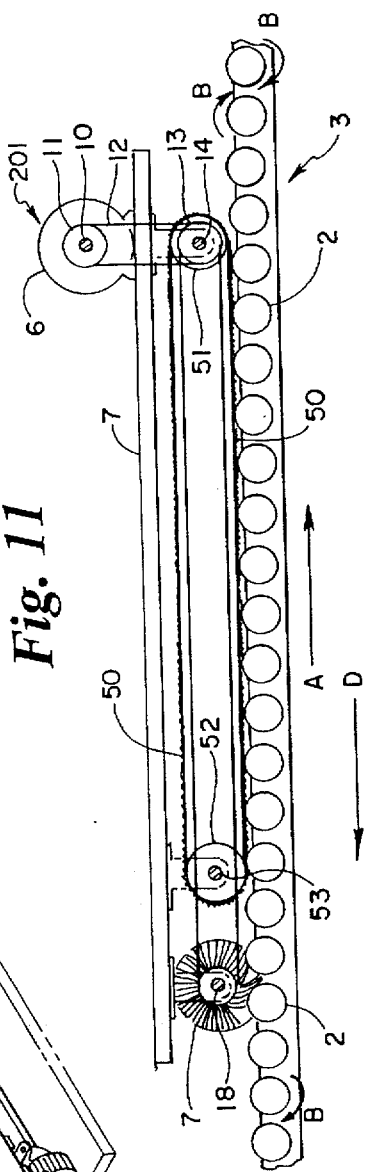
FIG. 11 is a side view of the embodiment shown in FIG. 10.

As best shown in FIG. 11, the platform 4 of the roller conveyor self cleaning apparatus 201 is no longer in contact with or engaging the rollers 2 of the roller conveyor 3. Instead, the rollers 2 frictionally engage the outward surface of one or more rotating endless traction belts 50, to provide the tractive force necessary to convey the roller conveyor apparatus 201 along the roller conveyor 3. If the endless traction belts 50 are not rotating, the roller conveyor cleaning apparatus 201 is conveyed along the roller conveyor 3 at a first velocity (the basic transport velocity of the roller conveyor 3) in direction A, as in the embodiments of the invention described above. However, if the endless belts 50 are rotating in a direction opposite to that of the rollers 2, the velocity of the roller conveyor cleaning apparatus 1 in direction A may be retarded such that the roller conveyor cleaning apparatus 1 is conveyed along the roller conveyor 3 at a second velocity relatively slower than the first velocity. This can be used to increase both the dwell time of cleaning element 7 over each roller 2 and the amount of surface area of each roller 2 that is contacted in one pass of the cleaning element 7.

Depending upon the speed of rotation of the endless belts 50, the velocity of the roller conveyor cleaning apparatus 201 in direction A may be retarded to such an extent that the roller conveyor cleaning apparatus 201 travels in direction D, opposite to direction A. On the other hand, if the endless belts 50 are rotating in the same direction as the rollers 2, the velocity of the roller conveyor cleaning apparatus 201 in direction A will be increased.

The endless belts 50 are rotatably driven by the motor 6, thereby controlling the direction and velocity of the roller conveyor cleaning apparatus 201 along the roller conveyor 3, as follows. Mounted to the motor rotated second shaft 14, described above, are a pair of sprockets 51 over which pass the pair of rotating endless belts 50 to sprockets 52. As best shown in FIG. 13, in this embodiment of the invention, the second shaft 14 has been extended such that it is approximately the same length as the rollers 2. The second shaft 14 is now journaled in two pairs of bearing blocks 20 generally disposed towards the ends of the second shaft 14. Sprockets 52 are mounted to a third shaft 53 which is journaled for rotation in two pairs of bearing blocks 20 generally disposed towards the ends of the third shaft 53. As shown in FIGS. 12 and 13, the sprockets 51 and 52 and the endless belts 50 are journaled within respective pairs of bearing blocks 20, although this is not required. Thus, the motor 6 will drivingly rotate the endless belts 50 through a plurality of shafts and sprocket and chain assemblies.

In this embodiment, the variable direction and speed of the motor 6 allows the roller conveyor cleaning apparatus 201 to be utilized in a variety of ways. For example, the speed of the motor 6 may be adjusted to retard the velocity of the roller conveyor cleaning apparatus 201 in direction A such that dwell time over each roller 2 increases and the cleaning element 7 engages the entire surface of the rollers 2 as the rollers 2 turn and the roller conveyor cleaning apparatus 201 is conveyed along the roller conveyor 3. This will particularly be of assistance where the cleaning element 7 has an abrasive or other surface that does not significantly deform and therefore contacts a relatively small arc or portion of the circumference of any roller 2.

In some cases, the rollers 2 may have become so encrusted with debris that engagement of each roller 2 with the cleaning element 7 for one revolution of the roller 2 will be insufficient to satisfactorily clean the roller 2. In such cases, the speed of the motor 6 may be adjusted to retard the velocity of the roller conveyor cleaning apparatus 201 in direction A such that the cleaning element 7 engages the entire surface of the rollers 2 for more than one revolution of the roller 2 as the roller conveyor cleaning apparatus 201 is conveyed along the roller conveyor 3.

Figure 10:
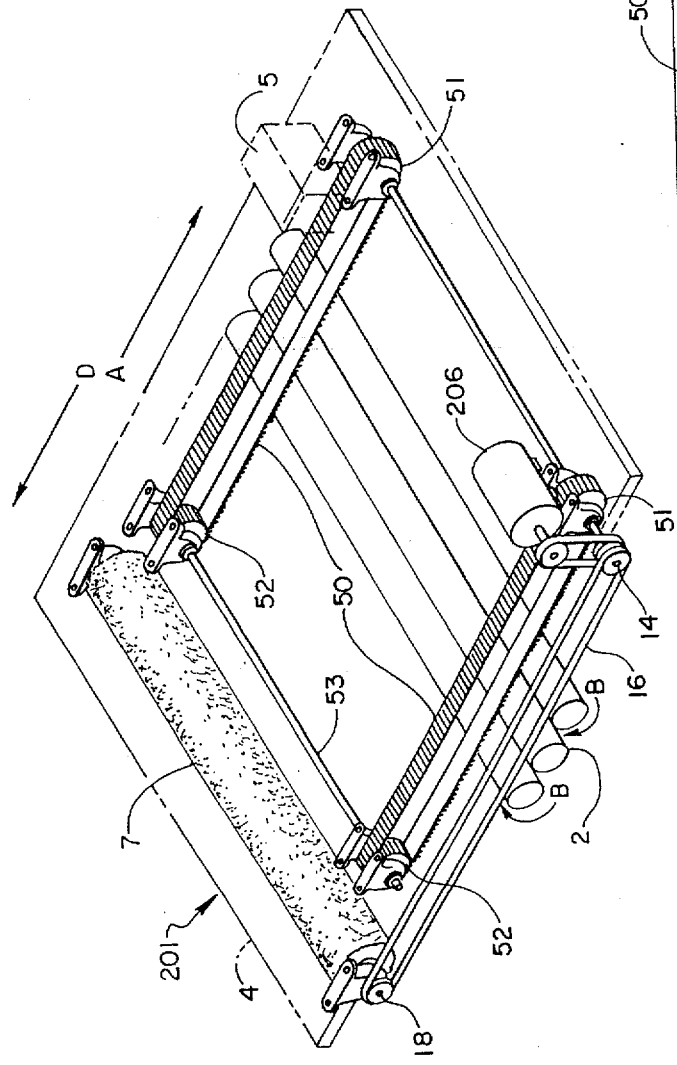
FIG. 10 is a perspective view of yet another embodiment of the invention.

In still other cases, it may be desirable to clean the rollers 2 from the end or termination of the roller conveyor 3 to the beginning or start of the roller conveyor 3; i.e., to convey the roller conveyor cleaning apparatus 201 in a direction opposite to direction A. In such cases, the speed of the motor 6 may be adjusted to retard the velocity of the roller conveyor cleaning apparatus 201 in direction A to such an extent that the roller conveyor cleaning apparatus 201 travels in a direction C, as shown in FIGS. 10 and 11. In this case, again, the speed of the motor 6 may be adjusted such that the entire surface of the rollers 2 is engaged by the cleaning element 7 any number of times.

In still other cases, it may be desirable to minimize the amount of time in which the roller conveyor cleaning apparatus 201 is conveyed along the roller conveyor 3 (and only necessary to clean the upper surface of he conveyor 3). In such cases, the direction and speed of the motor may be adjusted so that the endless belts 50 rotate in the same direction B as the rollers 2. In this case, the roller conveyor cleaning apparatus 201 will be conveyed along the roller conveyor 3 at a second velocity relatively faster than the basic transport velocity of the roller conveyor 3. However, in this case, a correspondingly smaller portion of the surface of the rollers 2 will be rotationally engaged by the first cleaning element 7.

In some cleaning situations encountered, a solvent may be needed to enhance cleaning effects. This feature could be added to any embodiment. For example, in the embodiment shown in FIGS. 1–5, a linear nozzle 60 attached to a solvent dispenser 62 by a conduit 64 (all shown in phantom in FIG. 2) would permit solvent to be applied to cleaning element 7.

The roller conveyor cleaning apparatus of the various embodiments disclosed reduces the amount of manual cleaning needed to clean the rollers 2 of a roller conveyor 3. Additionally, in all of the embodiments described above, it can be seen that the roller conveyor cleaning apparatus may be utilized while the roller conveyor 3 is in operation, thus reducing costs associated with the down time of the roller conveyor 3.

From the foregoing description, it will be apparent that modifications can be made to the roller conveyor cleaning apparatus and method for using same without departing from the teachings of the present invention. For example, although a single motor 6 is shown as driving both the endless belts 50 and the cleaning element 7 of the embodiment in FIGS. 10–13, two separate motors 77 and 78 could be used, as shown in FIG. 14. In this embodiment, the cleaning element 7 and the endless belts 50 may be rotated in different directions or at different rotational speeds. The two motor configuration could also be adapted to the embodiment of the invention shown in FIGS. 6–9, such that each cleaning element may be rotated in different directions or at different rotational speeds.

In yet another example shown in FIG. 15, reciprocating (or orbital), as opposed to rotating, cleaning elements 67 may be used. In FIG. 15, the reciprocating cleaning element 67 may be driven by the motor 68 to reciprocate in directions E and F substantially parallel to the axes of rotation C of the rollers 2, thereby providing the cleaning action to the rollers 2.

In still other examples, airjets or other cleaning element means may be used to remove debris from the rollers 2. Accordingly, the scope of the invention is only limited as necessitated by the accompanying claims.

I claim:

1. An apparatus for cleaning rollers of a roller conveyor comprising:

(a) a platform for frictionally engaging at its lower surface a plurality of the rollers such that the apparatus is conveyed along the roller conveyor by the rotation of the rollers; and (b) a first and second cleaning element secured to the platform, wherein the first and second cleaning elements are for engaging at least a portion of the surface of the rollers as the apparatus is conveyed along the roller conveyor;

wherein the second cleaning element is for engaging a portion of the surface of the rollers not engaged by the first cleaning element.

2. The apparatus of claim 1 wherein at least one of the cleaning elements is a cylindrical brush mounted to a brush shaft rotatably driven by a motor.

3. The apparatus of claim 2 wherein the motor is a DC motor.

4. The apparatus of claim 3 wherein at least one cleaning element is for rotationally engaging a portion of the surface of the rollers as the apparatus is conveyed along the roller conveyor.

5. The apparatus of claim 4 wherein at least one cleaning element is removably mounted to the platform.

6. The apparatus of claim 5 wherein the brush shaft of at least one cleaning element is drivingly connected to the motor by a plurality of sprocket and chain assemblies.

7. The apparatus of claim 6 wherein the motor is bidirectional.

8. The apparatus of claim 7 wherein the motor is a variable speed motor.

9. An apparatus for cleaning rollers of a roller conveyor, wherein the rollers convey items along the roller conveyor in a first direction, comprising:

(a) a platform;

(b) a rotatable endless belt operatively secured to the platform, wherein the outer surface of said endless belt is for frictionally engaging a plurality of the rollers such that the apparatus is conveyed along the roller conveyor in the first direction; and (c) a cleaning element secured to the platform, wherein the cleaning element is for engaging a portion of the surface of the rollers as the apparatus is conveyed along the roller conveyor.

10. The apparatus of claim 9, wherein the rotational speed of the endless belt may be adjusted such that the velocity of the apparatus in the first direction is retarded.

11. The apparatus of claim 10 wherein the velocity of the apparatus in the first direction may be retarded such that the cleaning element engages the entire surface of one or more rollers as it is conveyed.

12. The apparatus of claim 11 wherein the rotational speed of the endless belt may be adjusted such that the apparatus travels in a second direction opposite to the first direction.

13. The apparatus of claim 12 wherein the cleaning element rotates and is for rotationally engaging a portion of the surface of the rollers as the apparatus is conveyed along the roller conveyor.

14. The apparatus of claim 13, wherein the rotational speed of the cleaning element is controlled by a DC motor, and wherein the rotational speed of the endless belt is controlled by a DC motor.

15. The apparatus of claim 14, wherein the cleaning element and the endless belt are rotatably mounted to motor driven shafts.

16. The apparatus of claim 15 wherein the shafts are motor driven by at least one sprocket and chain assembly.

17. The apparatus of claim 16 wherein the cleaning element and the endless belt are driven by the same motor.

18. The apparatus of claim 17 wherein the motor is bidirectional.

19. The apparatus of claim 18 wherein the motor is a variable speed motor.

* * * * *